C. B. SCHOENMEHL.
BATTERY ELEMENT SUPPORT.
APPLICATION FILED DEC. 9, 1910.
987,648.
Patented Mar. 21, 1911.
2 SHEETS—SHEET 1.
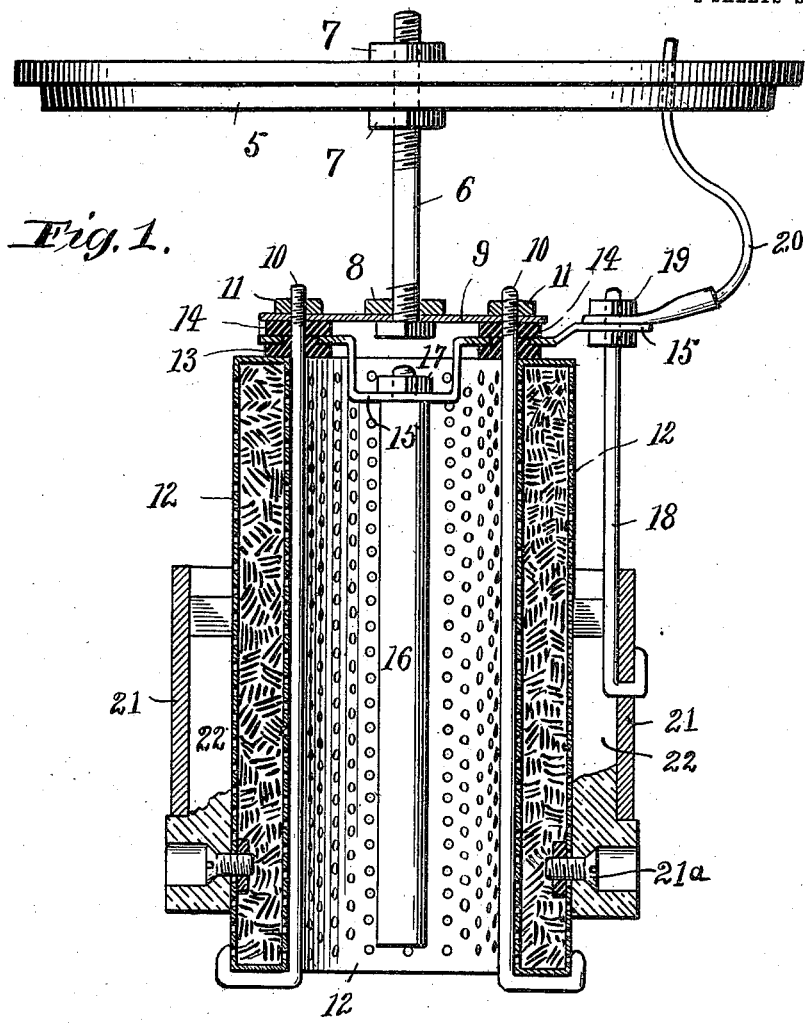
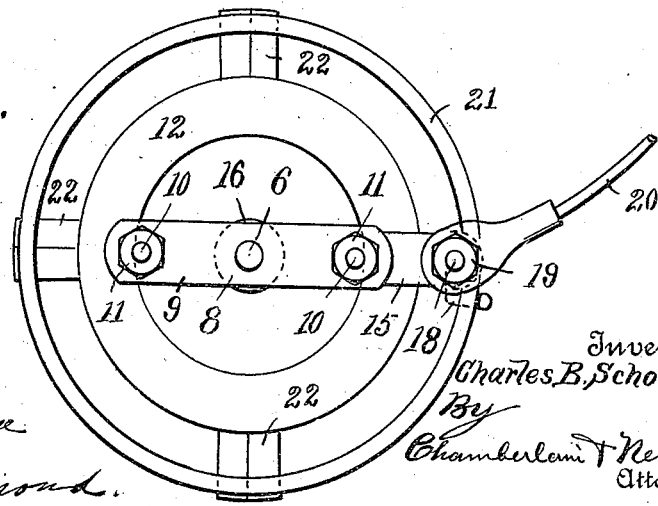
Witnesses
Ivan L. Morehouse
Ruth Raymond
Inventor
Charles B. Schoenmehl
By
Chamberlain & Newman
Attorneys

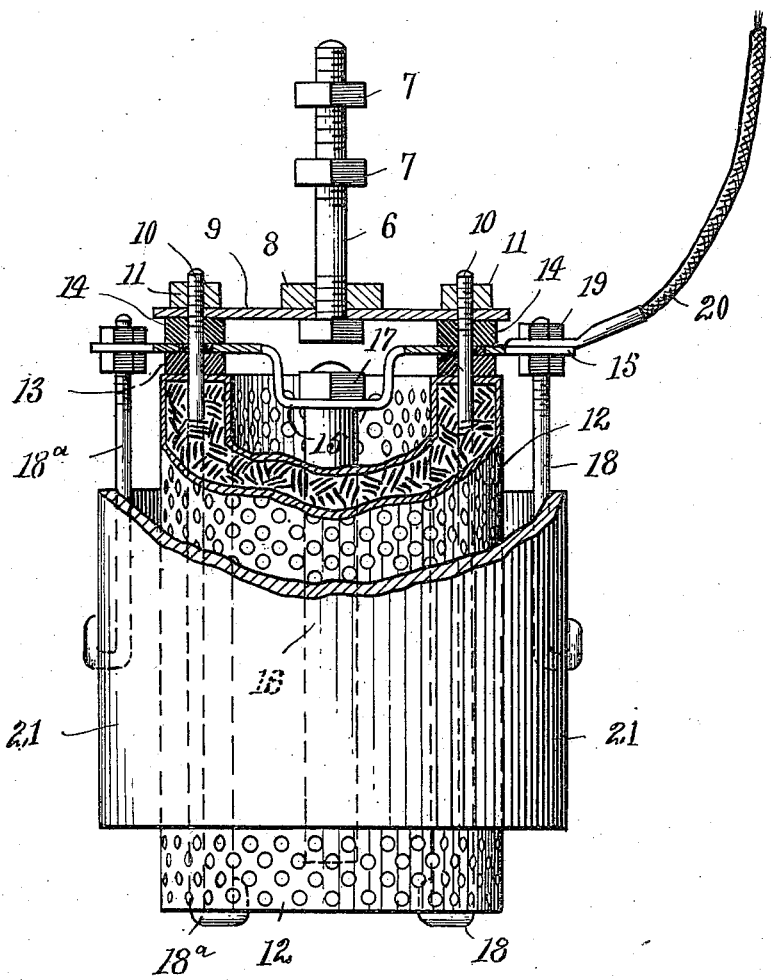

UNITED STATES PATENT OFFICE.

CHARLES B. SCHOENMEHL, OF WATERBURY, CONNECTICUT.

BATTERY-ELEMENT SUPPORT.

987,648.     Specification of Letters Patent.     Patented Mar. 21, 1911.

Application filed December 9, 1910. Serial No. 596,395.

*To all whom it may concern:*

Be it known that I, CHARLES B. SCHOENMEHL, citizen of the United States, and resident of Waterbury, in the county of New Haven and State of Connecticut, have invented certain new and useful Improvements in Battery-Element Supports, of which the following is a specification.

My invention relates to new and useful improvements in primary batteries employing oxid of copper scale and zinc as their electrodes and resides particularly in the arrangement of a zinc, or positive element both inside and outside of the basket or container in which the copper scales are held.

Heretofore an annular circular container filled with oxid of copper, and a circular zinc have in part formed a popular style of battery, though they have been separately hung from the jar cover which was objectionable.

It is therefore the purpose of my present invention to provide a novel construction of such type of assembled elements, copper scale and zinc, whereby the two may be suspended on a single rod from the cover of a jar and whereby an extra zinc may be used inside the annular copper container in addition to that on the outside as heretofore employed. The zincs are electrically connected one with the other but are insulated from the basket containing the copper scale, or negative element.

Similar characters of reference are used to designate like or corresponding parts throughout the several figures of the accompanying drawings, and of which, Figure 1, shows a central, vertical sectional view through an assembled battery element constructed in accordance with my invention and comprising in part an annular basket filled with copper scale, a circular zinc surrounding the basket and a zinc rod disposed centrally within the basket. Fig. 2, shows a detached plan view of the construction shown in Fig. 1, and Fig. 3, shows a side view, partly broken away, of a slightly different form of assembled battery element and incorporating my improvements.

Referring in detail to the characters of reference marked upon the accompanying drawings 5 represents a battery jar cover from which my assembled element may be supported by means of a single rod 6 and clamping nuts 7. The lower end of this rod is headed and a nut 8 is attached to the threaded portion of the rod adjacent to the head. A plate 9 is clamped between the said head and nut for carrying the elements. Rods 10—10 are secured to the outer end portions of the plate by means of nuts 11. These rods may be disposed down through the open central portion of the perforated basket 12 as seen in Fig. 1, or they may be passed directly through the filled part of the basket as seen in Fig. 3, and their lower end portions are bent out and up over the lower end of the said basket in a way to support the same. Both the inside and outside of the basket is made of perforated sheet metal while the top and bottom end portions are preferably formed of solid metal. These perforations permit the solution of the battery to freely enter the basket and penetrate the copper oxid. Insulating washers 13 and 14 are arranged upon the rods and intermediate of basket and the before mentioned plate 9 and a cross yoke 15. The cross yoke is thus insulatively connected to the rods and serves to support the inside zinc 16 that is in the form of a rod, and shown attached by means of a screw and nut 17.

The outer end of the yoke is pierced to receive a wire 18 that is secured thereto by nuts 19 and which may also serve for the attachment of a field wire 20. The opposite end portion of this wire is fastened to the circular zinc electrode 21 that extends around the perforated basket containing the copper scale, and may be supported on insulating blocks 22 that are secured to the said basket by means of screws $21^a$ as shown in Figs. 1 and 2, or it may be hung by two wires 18 and $18^a$ from the cross yoke 15 as shown in Fig. 3. A second field wire not shown, can be attached to the upper end of the rod 6 by means of a suitable binding nut, as would be obvious.

An element of the foregoing described character would of course be used in connection with a suitable exciting solution when contained within a porcelain or other practicable form of battery jar. The arrangement of a positive element both inside and outside of the negative element insures a double attack upon the copper, one from the outside and the other from within thus producing a stronger acting battery.

Having thus described my invention what

I claim and desire to secure by Letters Patent is—

1. The combination of an annular perforated basket containing oxid of copper scale and constituting a negative electrode, rods engaging and supporting the same, a plate connecting the upper ends of the rods, a single suspending rod for the plate, a yoke insulatively attached to the said rods, a zinc suspended from the said yoke within the basket, insulating blocks secured to the basket, a second zinc supported upon and encircling the basket, and a wire connection from the outside zinc to the yoke.

2. The combination of an annular perforated basket containing oxid of copper scale and constituting a negative electrode, rods for supporting the same, a plate connecting the upper ends of the rods, a single suspending rod for the plate, two zinc elements one inside and another outside of the annular basket, a yoke connecting the three elements but insulated from the negative element and insulating blocks attached to the negative basket for supporting the outside zinc element.

3. The combination of an annular perforated basket containing oxid of copper scale and constituting a negative electrode, rods for supporting the same, a plate connecting the upper ends of the rods, a single suspending rod for the plate, a second cross yoke insulatively attached to the rods, a zinc within the basket and connected to the yoke, a second zinc encircling the basket and insulatively supported upon blocks secured to the basket, and connected with the said yoke.

Signed at Bridgeport, in the county of Fairfield and State of Connecticut, this 7th day of December, A. D., 1910.

CHARLES B. SCHOENMEHL.

Witnesses:
C. M. NEWMAN,
RUTH M. WORDEN.

Copies of this patent may be obtained for five cents each, by addressing the "Commissioner of Patents, Washington, D. C."